W. ARTER.
CURRENT COLLECTOR OR TROLLEY.
APPLICATION FILED DEC. 28, 1908.
997,597.
Patented July 11, 1911.
3 SHEETS—SHEET 3.
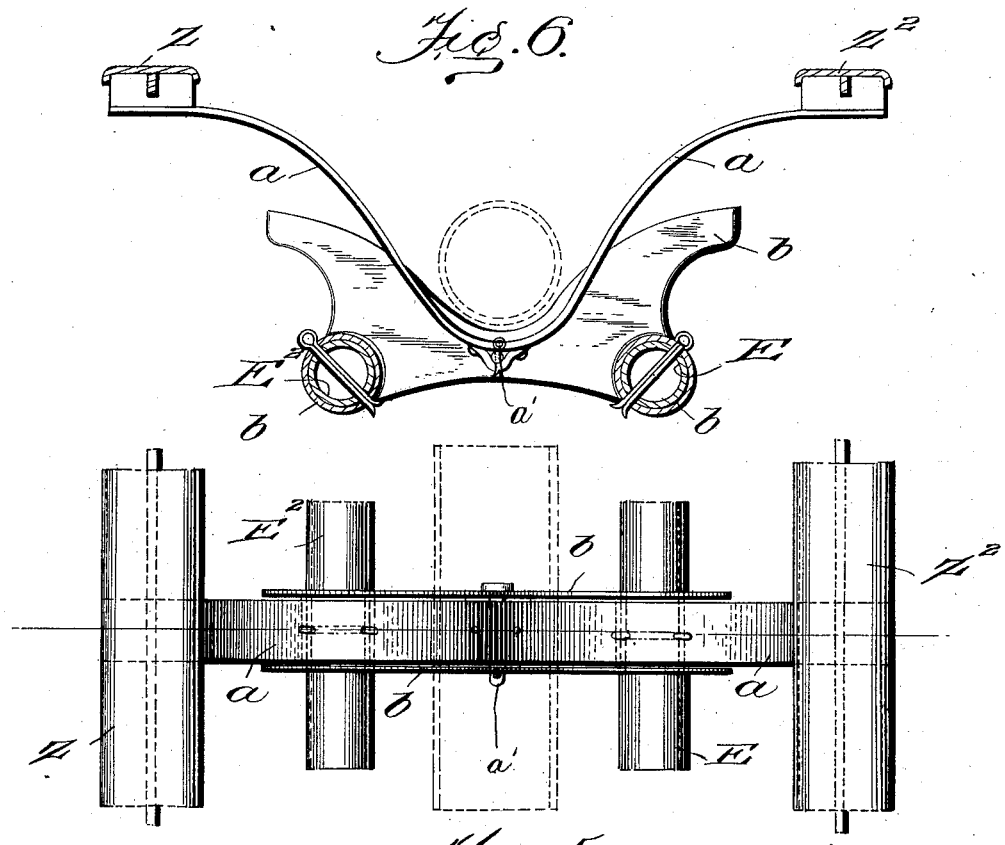
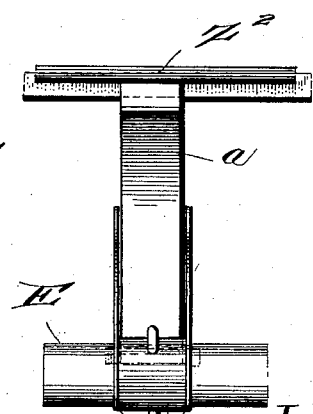
Witnesses.
Jas E. Dodge.
M. F. Keating.
Inventor
William Arter,
by Charles J. Kintner
Attorney.

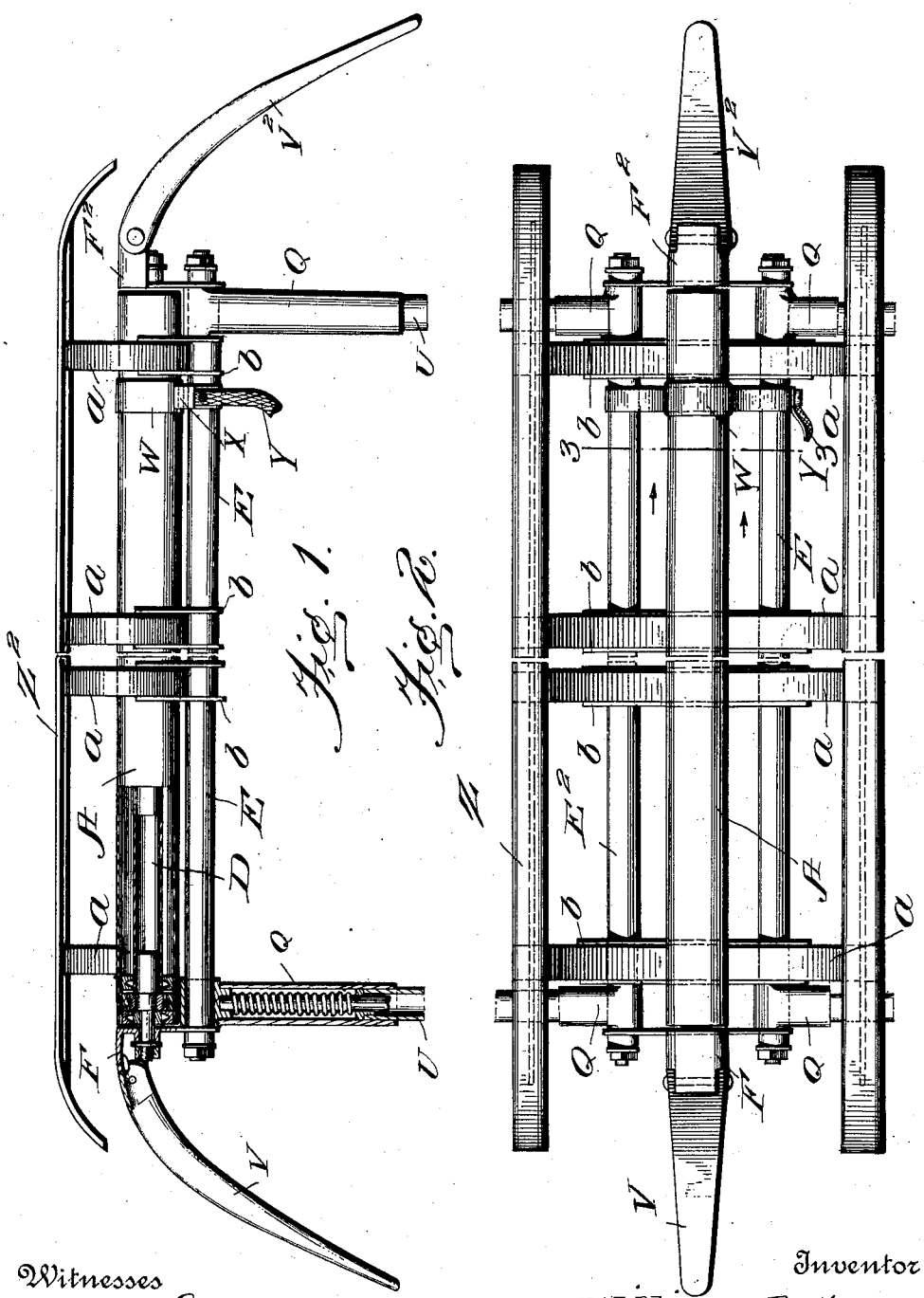

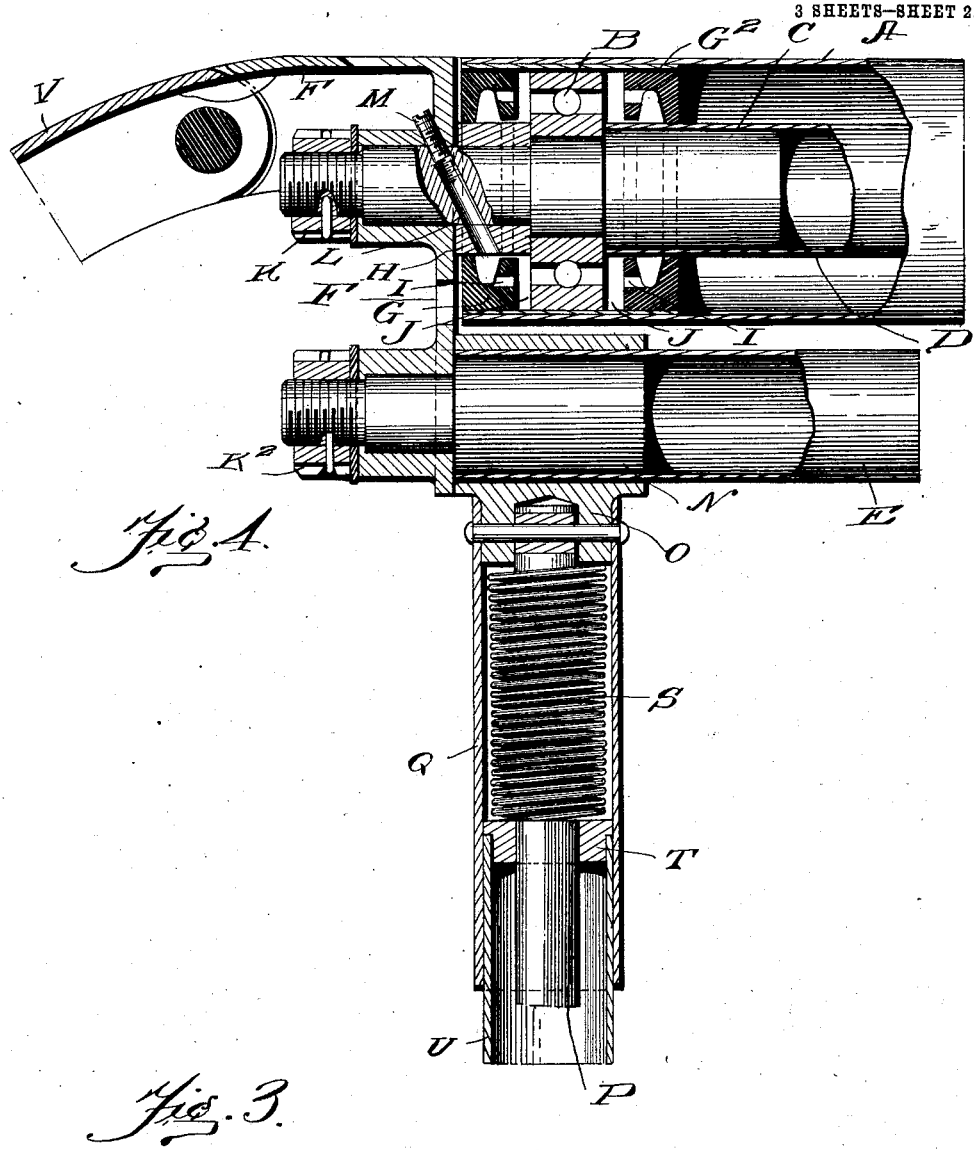

UNITED STATES PATENT OFFICE.

WILLIAM ARTER, OF RICHMOND HILL, NEW YORK.

CURRENT-COLLECTOR OR TROLLEY.

997,597. Specification of Letters Patent. Patented July 11, 1911.

Application filed December 28, 1908. Serial No. 469,700.

*To all whom it may concern:*

Be it known that I, WILLIAM ARTER, a subject of the King of Great Britain, and resident of Richmond Hill, county of Queens, and State of New York, have made a new and useful Invention in Current-Collectors or Trolleys, of which the following is a specification.

My invention relates to improvements in current collectors or shoes, such as are ordinarily used in connection with electric railways, elevators, etc., although the same may be applied any place where it is desired to collect a current or currents between a stationary conductor and a moving contact maker, and it has for its objects first, to minimize, as far as possible, the absolute separation between the current collector and the stationary conductor or conductors, thereby avoiding dangerous arcing. Second, to provide a traveling current collector or shoe which shall be subject to as little wear and tear as possible. Third, to provide a traveling current collector or shoe which shall have a plurality of contact points with the stationary conductor or conductors, the parts being so constructed or arranged that there shall be at all times actual conductivity of current between the movable and stationary parts. Fourth, to provide a current collector or shoe of that type in which the contacting parts are of the nature of rods, bars, or rollers, located transverse the stationary conductor with yieldingly supported conducting horns at the opposite ends, for the purpose of preventing the device from becoming entangled with the stationary wires or conductors. Fifth, to provide a current collector or shoe for use in connection with high speed electrically propelled cars in which the contacting part thereof is in the nature of a metallic cylindrical roller having ball bearings at the ends thereof, said ball bearings being inclosed in oil tight chambers, which chambers are in turn provided with means for supplying the oil through openings extending through the heads of the frame upon which the contact roller is journaled.

For a full and clear understanding of the invention, such as will enable others skilled in the art to construct and use the same, reference is had to the accompanying drawings, in which, Figure 1 is an elevational view of my improvement, a part thereof being illustrated in broken sectional view; Fig. 2 being a plan view of Fig. 1 as seen looking from the top toward the bottom of the drawings. Fig. 3 is a cross sectional view taken on the line 3—3 of Fig. 2. Fig. 4 shows one end of the device in longitudinal section, and partly broken away. Fig. 5 is a top plan view of a part of Fig. 2. Fig. 6 is a side elevation, partly in section, of Fig. 5, and; Fig. 7 is an end elevation of Fig. 5.

Referring now to the drawings in detail, D E and $E^2$ represent transverse rods or supports constituting, together with the heads F, $F^2$, a supporting frame work. Each of the heads F, $F^2$ has an extension or neck adapted to receive the diminished ends of connecting pins C, N and N secured respectively within the inner surfaces of the opposite ends of the transverse rods or supports D, E and $E^2$. The outer ends of the pin C are of two different diameters for the purpose of adapting them to securely hold the parts together in relation to the roller bearing parts, as will be described later on; while the outer ends of the pins N are all of smaller diameter for the purpose of fitting them within the inner ends of the extensions or necks of the heads F, $F^2$.

K and $K^2$ are nuts for securely locking all of the parts in fixed relation to each other.

A represents the main brush or contact roller which has secured at each end a sleeve in the center of which is located one part of the ball race-way for the balls B of the roller bearing, the other part of said raceway being secured directly to one shoulder of the connecting pin C.

G and $G^2$ are disks secured in the end of the sleeve which supports the ball race-way, said disks fitting accurately over the outer surface of the rod or support D and grooved as shown with channels and outlets I, the arrangement being such that the chamber J in which the ball bearing is located will be freely lubricated; H being a washer resting between that part of the ball race-way supported by the connecting pin C and the inner face of the heads F or $F^2$.

L is an oil groove extending from the oil chamber J through the washer H, the diminished end of the pin C and the extension or neck of the head through which said pin passes. This oil groove is provided with a screw-plug M and the entire arrangement is such that after the oil chambers are filled the inclosed ball bearings at both ends of the contact roller A are always abundantly well supplied with oil, owing to the centrifugal action of the rollers upon such oil, and this feature constitutes an important part of my invention.

Q, Q represent hollow sleeves and U, U represent the downward extensions of the trolley which are preferably of tubular form and may be secured in any well known manner to the moving car, vehicle or appliance, to or through which the current is to be carried for ultimate use. These extensions are secured to my improved current collector or shoe through the agency of the sliding sleeves Q attached at their upper ends to eye-pins O slipped over the ends of the rods or supports E, $E^2$, to which they are secured by rivets, these rivets in turn supporting vertically disposed sliding rods P which act as guide-ways in each instance for a spring S, one end of which rests against a washer or cap T in the upper end of the extension U, and the other against the pin O; these four springs constituting a means for yieldingly supporting the entire current collector or shoe.

The upper surface of the heads F and $F^2$ are provided with curvilinear integral extensions to which are pivoted, as shown, downwardly extending horns V, $V^2$ adapted to rest, by the action of gravity, in the manner shown in Fig. 1, the function of these pivoted horns being to prevent the entire collector or shoe from becoming entangled with the trolley wire or conductor in the event of the same being forced into position thereunder, as often occurs with existing types of trolley shoes which do not have such downwardly extending horns. Should the ends of the trolley shoe pass by the trolley wire or wires, then these pivoted or downwardly turned ends enable the return of the trolley shoe to its proper position.

Z, $Z^2$ represent auxiliary or supplemental conductors which differ from the primary or main contact roller A in that they are simple metal bars with downwardly extending horns at their opposite ends, as shown and they are supported parallel with each other and with the main contact roller A by relatively short curvilinear springs $a$, $a$, pivotally connected to the metal standards on plates $b$ by means of the pin connection $a'$, as illustrated in Figs. 3 and 7, said standards in turn being secured directly to the rods E and $E^2$ by pins in the manner shown in Figs. 6 and 7.

W (see Fig. 1) is a contact ring which is secured around the circumference of the contact roller A and X is a stationary contact spring or brush secured in turn directly to the cross rods or supports E and $E^2$ to which is attached the usual insulated conductor Y which is ultimately supported directly by the pole or poles extending to the moving vehicle where the current is to be used. These connections are illustrated in Figs. 1 and 3. I have illustrated in the drawings four sets of relatively short continuous leaf springs $a$, $a$, $a$, $a$ adapted to support the auxiliary or supplemental conductors Z $Z^2$. This number, of course, may vary from two to any desired number. These springs $a$, $a$ being continuous, when any depression or uneven surface in the trolley conductor strikes the front supplemental conductor Z or $Z^2$, dependent upon which direction the car is running, the pressure transmitted therefrom through the relatively short continuous springs $a$, $a$, will impart an additional pressure upon the other supplemental conductor Z, or $Z^2$ thereby absolutely assuring a continuous contact by reason of such additional pressure.

It is believed that in view of the description heretofore made the assembling of the parts as a whole is obvious, it being apparent that when the entire structure is ready for operation the nuts K, $K^2$ $K^2$ acting upon the outer ends of the connecting pins C, N and N at each end of the structure constitute means for giving to the device a rigid trussed effect, the first diminished portion of the pins C which support the inner part of the race-way acting against the same and against the washer H to bind this part of the structure against the inner faces of the heads F and $F^2$, the outer faces of the pins N acting to bind in like manner the rods E and $E^2$ against the lower inner faces of said heads. In use, therefore, it is to be noted that my novel current collector or shoe is possessed of especially valuable features, in that the two systems of yielding support, namely, the springs S, S, S, S with their sliding sleeves Q Q Q Q and the short flat springs $a$, $a$, $a$, $a$, for supporting the auxiliary or supplemental conductors Z $Z^2$, will afford a means for giving the best possible yielding effect as between the moving system and the stationary conductor or conductors from which they pass, so that such a collector or shoe may be used with trolley wires where the sag or drop thereof as between the suspension points is considerable, and this without any danger of actual rupture between the collector and the stationary conductor.

I do not limit my invention to the details of construction disclosed in the accompanying drawings, as obviously a number of the features thereof might be materially departed from and still come within the scope of my claims hereinafter made.

Having thus described my invention what I claim and desire to secure by Letters Patent of the United States is—

1. A current collector or trolley comprising a rectangular frame, a contact roller journaled in the ends of said frame, vertically disposed plates mounted on the sides of said frame, a plurality of parallel, supplemental conductors, resilient arms secured to said plates and supporting said conductors, and supporting means for said rectangular frame.

2. A current collector or trolley comprising a rectangular frame, said frame having a central and side bars disposed in parallel relation; a contact roller journaled on said central bar; vertically disposed plates mounted on said side bars; a plurality of parallel, supplemental conductors; arms mounted on said vertical plates and supporting said supplemental conductors; and resilient supporting means for said rectangular frame.

3. A current collector or trolley comprising a rectangular frame having a central and side bars disposed in parallel relation; a contact roller journaled on said central bar; vertically disposed plates mounted on said side bars; a plurality of parallel, supplemental conductors; leaf spring arms mounted on said plates and supporting said supplemental conductors; and resilient supporting means for said rectangular frame.

4. A current collector or trolley comprising a rectangular frame, a contact roller journaled within said frame, vertically disposed plates mounted in pairs on said frame; a plurality of parallel, supplemental conductors; resilient supporting arms for said conductors mounted on and between said pairs of parallel plates; and resilient supporting means for said rectangular frame.

5. A current collector or trolley comprising a rectangular frame, said frame consisting of heads connected by bars disposed in parallel relation; a contact roller journaled on one of said bars; vertically disposed plates mounted on said frame, a plurality of supplemental conductors disposed above said contact roller; resilient arms mounted on said frame and supporting said supplemental conductors; downwardly disposed horns pivotally mounted on said frame heads; and resilient supporting means for said rectangular frame.

6. A current collector or trolley comprising a frame, said frame having end heads and side bars; pins mounted on said heads, a sleeve mounted on and connecting said pins; a contact roller, ball-bearing journals on said pins for said roller; disks mounted on said roller disposed to either side of said journals, said disks providing lubricant chambers; and supporting means for said frame.

WM. ARTER.

Witnesses:
  HAROLD TATTERSALL,
  CHAS. O. COLLETT.

---

Copies of this patent may be obtained for five cents each, by addressing the "Commissioner of Patents, Washington, D. C."